United States Patent [19]

Harrold

[11] Patent Number: 5,603,356

[45] Date of Patent: Feb. 18, 1997

[54] FLUID FLOW CONTROL VALVES

[75] Inventor: Martyn J. Harrold, Lower Quinton, England

[73] Assignee: IMI Norgren Limited, Staffordshire, England

[21] Appl. No.: 459,778

[22] Filed: Jun. 2, 1995

[51] Int. Cl.⁶ ....................................... E03B 1/00
[52] U.S. Cl. .................. 137/625.21; 137/625.45
[58] Field of Search ........................... 137/625.21, 625.45

[56] References Cited

U.S. PATENT DOCUMENTS

| | | | |
|---|---|---|---|
| 1,287,975 | 12/1918 | Haatvedt | 137/625.45 |
| 2,598,148 | 5/1952 | Thrush | 137/625.45 |
| 3,608,866 | 9/1971 | Karpacheva et al. | 137/625.21 X |
| 3,872,889 | 3/1975 | Smith . | |
| 3,924,832 | 12/1975 | Babcock | 137/625.21 X |
| 4,340,203 | 7/1982 | Donner . | |

FOREIGN PATENT DOCUMENTS

| | | |
|---|---|---|
| 471226 | 1/1951 | Canada . |
| 0324698 | 7/1989 | European Pat. Off. . |
| 210178 | 1/1924 | United Kingdom . |
| 2127940 | 4/1984 | United Kingdom . |

*Primary Examiner*—Hoang Nguyen
*Attorney, Agent, or Firm*—Cushman Darby & Cushman IP Group of Pillsbury Madison & Sutro LLP

[57] ABSTRACT

A slide valve, especially for use in a compressed air supply installation, includes a body defining an inlet passageway and an outlet passageway and a vane having an orifice therethrough and movable laterally relative to the passageways between a valve-open position in which the orifice is in register with the passageways thereby permitting fluid to flow through the valve, and a valve-closed position in which the orifice is wholly out of register with the passageways thereby isolating the inlet passageway from the outlet passageway. The vane defines, at least in part, an exhaust passageway that, in the valve-closed position, connects the outlet passageway to atmosphere via a further exhaust passageway formed in the body whereby, in the valve-closed position, the downstream side of the installation will automatically become depressurized.

5 Claims, 4 Drawing Sheets

FLUID FLOW CONTROL VALVES

This invention relates to fluid flow control valves and more particularly to so-called "slide valves" for use especially, but not exclusively, in compressed air installations.

In compressed air installations, it is common practice to include one or more isolating stop valves that are normally in their "on" position, i.e. when the installation is operational, but that can, when necessary, be manually turned off in order to isolate one or more sections of the installation for servicing purposes. Clearly, the or each section that requires servicing must be depressurised and, for that reason, the isolating valve may, when in its "off" position, act not only to interrupt the compressed air supply but also to exhaust air in the relevant section to atmosphere. Hitherto, it has been usual to use for that purpose a ball valve. Such valves are, however, relatively expensive to produce because of the close tolerances required in the machining/moulding of the ball closure and the part-spherical seats associated with it. Accordingly, slide valves have been used as alternatives but the known designs have the disadvantage that it is not possible to fit an exhaust silencer or to pipe the exhaust air to a remote location. It is an object of the present invention to provide a slide valve that overcomes that disadvantage.

According to the present invention, a stop valve adapted, in its "off" position, to exhaust the upstream or downstream side of the valve to atmosphere is based on a slide valve and, more particularly, comprises a body defining an inlet, an outlet and a passageway extending therebetween, and a vane having an orifice therethrough and moveable laterally across the passageway between a valve-open position in which the orifice is in register with the passageway thereby permitting fluid to flow from the inlet to the outlet and a valve-closed position in which the orifice is wholly out of register with the inlet and outlet thereby isolating the inlet from the outlet, the vane defining, at least in part, an exhaust passageway that, in the valve-closed position, connects said inlet or said outlet to atmosphere, characterised in that said exhaust passageway communicates, in the valve-closed position, with a further exhaust passageway formed in the body and that opens to atmosphere.

The vane may move in linear fashion laterally across the passageway, but in a preferred embodiment it is pivotally mounted in the body and thus moves in an arcuate path.

Preferably, the further exhaust passageway formed in the body terminates in a threaded port in which a conventional silencer or pipe connector may be threadedly secured.

In a preferred embodiment, the exhaust passageway is defined in part by a channel formed in a surface of the vane, the channel together with a facing surface of the body defining an enclosed exhaust passageway that, in the valve-closed position, connects the inlet or, usually, the outlet of the valve to atmosphere, via the further exhaust passageway formed in the body.

In principle, a valve constructed in accordance with the invention may be glandless but the close tolerances then required will detract from the cost advantages that it has over known ball type valve constructions. Accordingly, it is much preferred to use, for example, elastomeric seals in order to achieve the necessary fluid tightness.

One embodiment of the invention will now be described in more detail, by way of example only, with reference to the accompanying drawings, in which.

Figure 1:
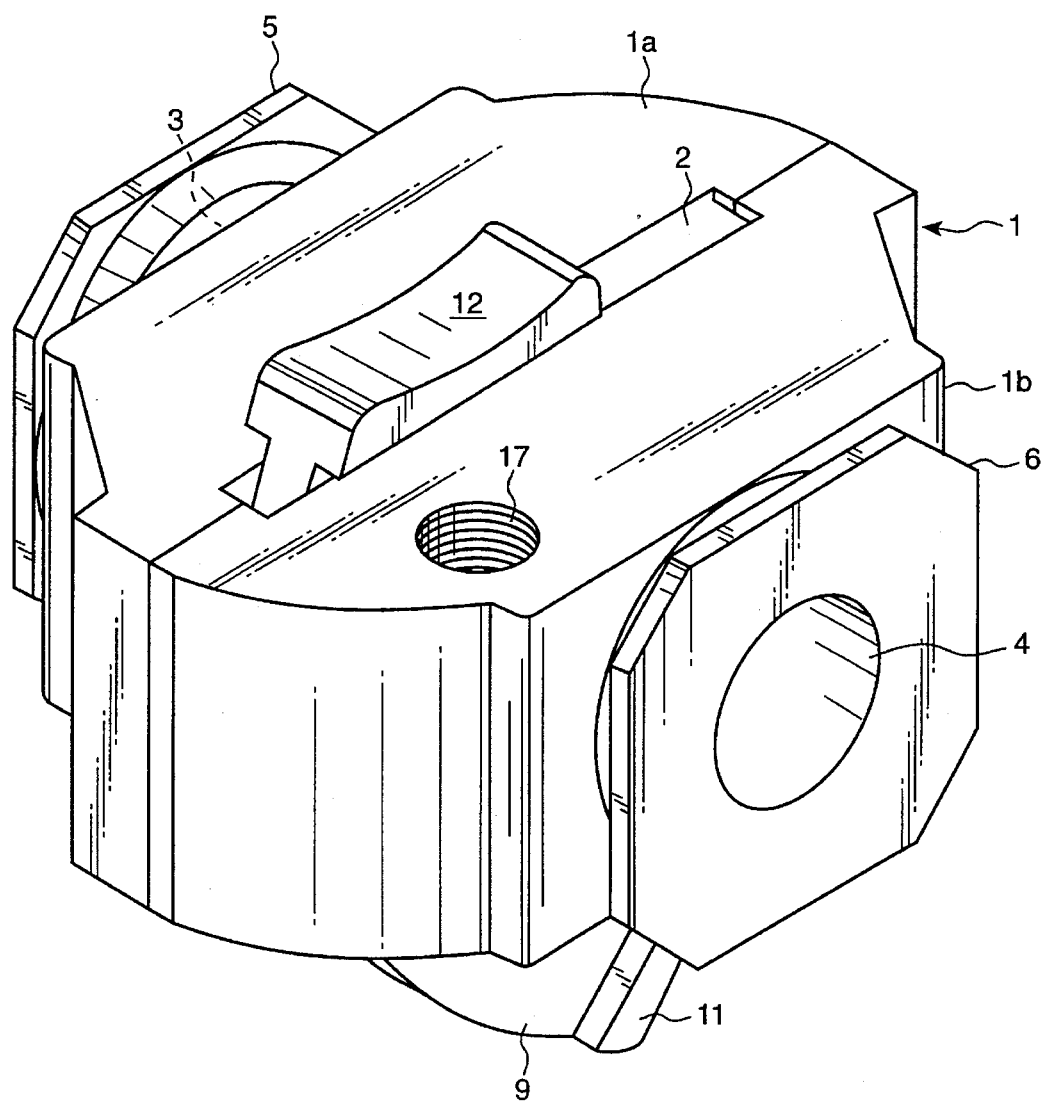
FIG. 1 is an isometric view of the valve it its closed position.

Referring to the drawings, the valve comprises a body 1 made in two halves 1a and 1b joined together by, for example, bolts (not shown). The two body halves 1a and 1b define centrally between them a generally rectangular cavity 2 from which extends, in the part 1a, a cylindrical inlet passageway 3 and, in the part 1b, a cylindrical outlet passageway 4. The inlet and outlet passageways 3, 4 terminate at their outer ends respectively in ported flanges 5 and 6 whereby the valve may be incorporated downstream, for example, of a filter, lubricator, regulator assembly (not shown) of a compressed air installation using suitable clamping devices. The two opposed faces of the body parts 1a and 1b have respective annular recesses formed in them circumscribing passageways 3 and 4 and in which rubber seals 7 and 8 respectively are located.

Figure 3:
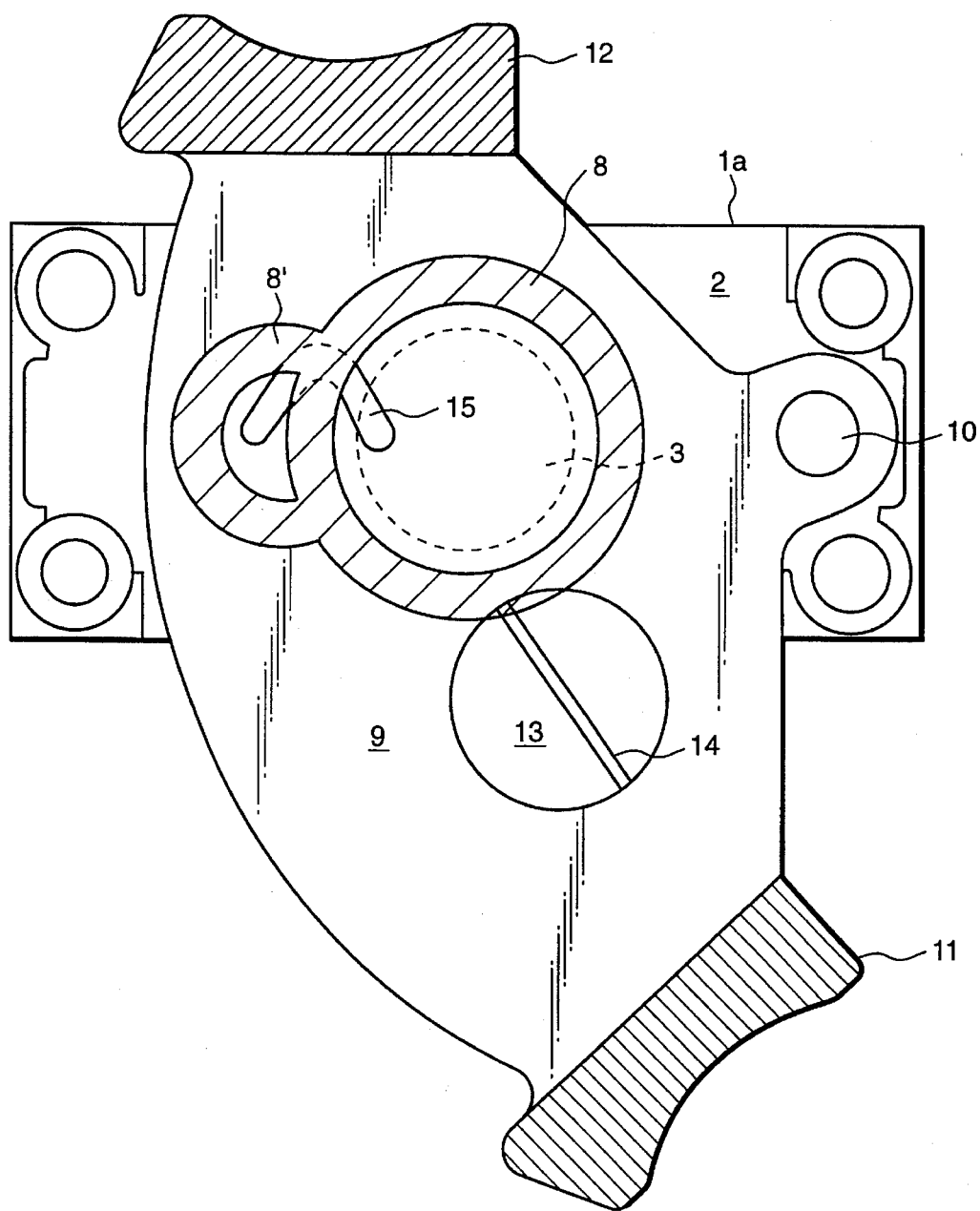
FIG. 3 is a view on the line III—III of FIG. 2, again with the valve in its closed position.
Figure 4:
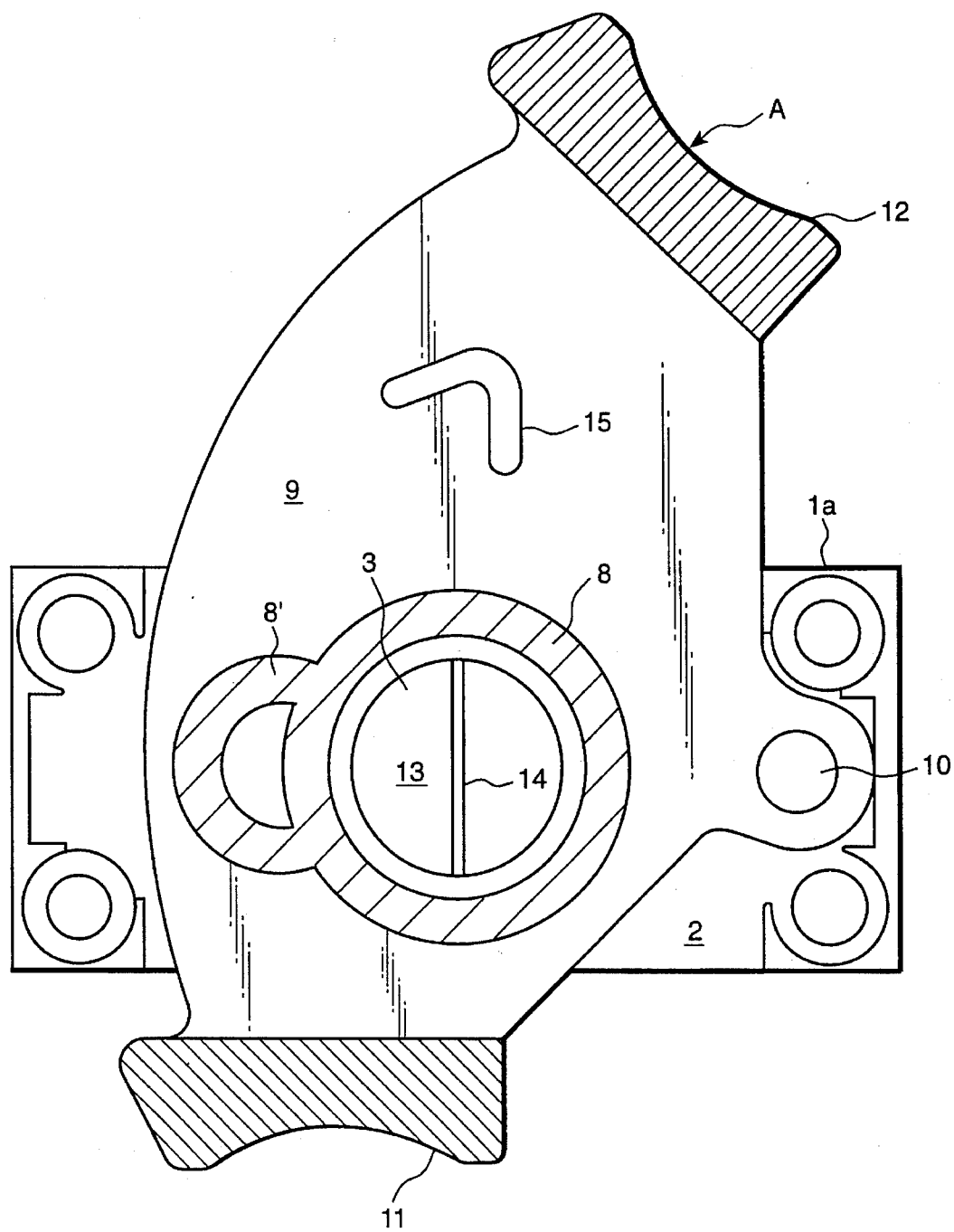
FIG. 4 is a similar view to that of FIG. 3 but showing the valve in its open position.

The cavity 2 has a vane 9 pivotally mounted, at 10, in it, the extremities 11, 12 thereof being enlarged in order to facilitate manual actuation of the valve. The vane 9 has an aperture 13 formed through it, whose overall diameter corresponds to that of the passageways 3 and 4, and which is divided into two substantially semicircular sections by a member 14. The surface of the vane 9 facing the body part 1b is further formed with a V-shaped exhaust channel 15 which, when the valve is in its closed position (as is described in more detail below) connects the outlet passageway 4 to an exhaust passageway 16 formed in the body part 1b, the passageway 16 terminating in a threaded exhaust port 17 with which a silencer or exhaust pipe-line connector (not shown) may be engaged. The entrance to the exhaust passageway 16 is surrounded by a seal 8' which in fact is formed integrally with the seal 8 and which sits in an annular recess formed in the body part 1b. FIGS. 3 and 4 show, in section, the seals 8 and 8' which, as can be seen, are in the shape of a figure 8 and which, for stability, may comprise an elastomer, such as a nitrile rubber, bonded to a steel insert.

Figure 2:
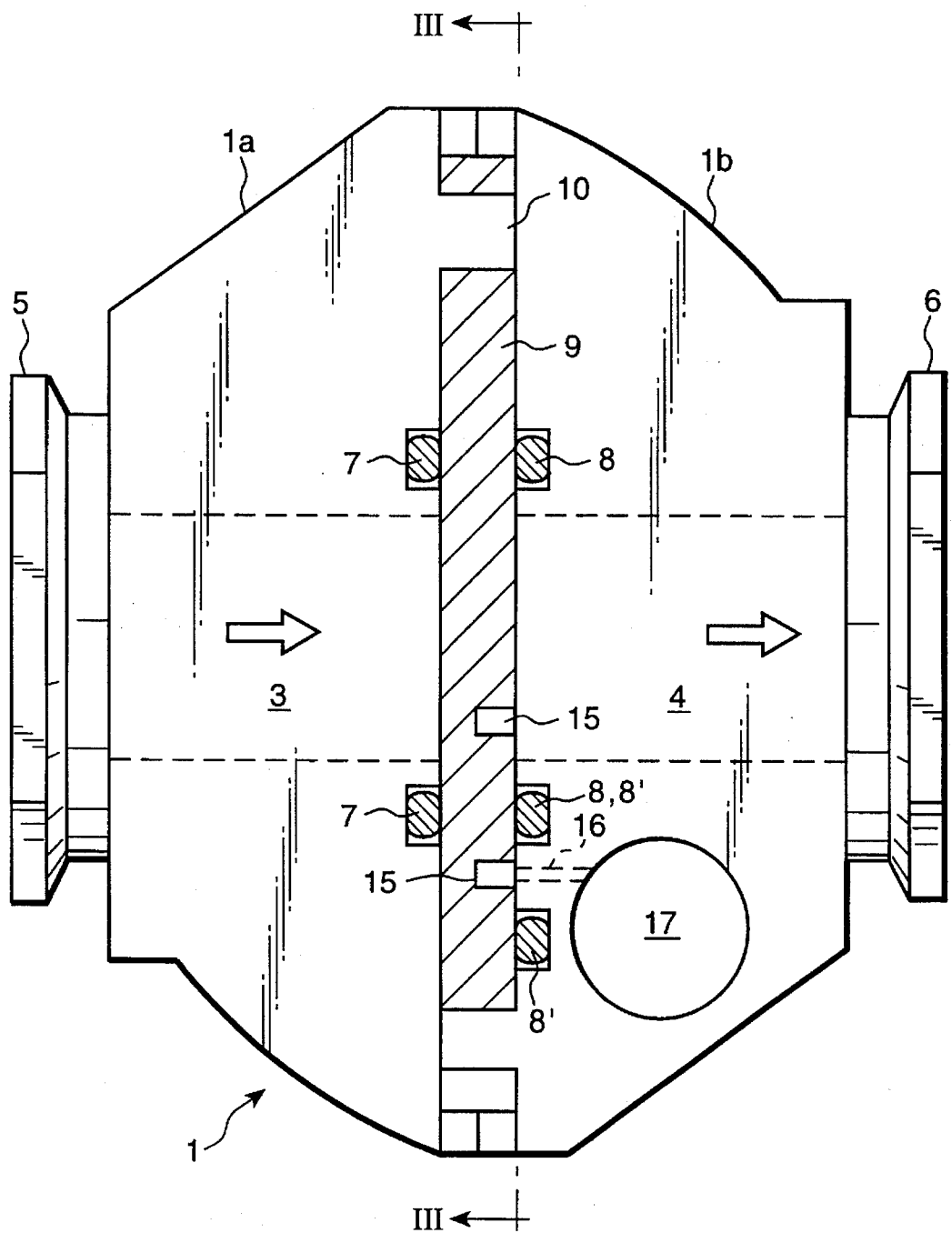
FIG. 2 is a plan view, partly in section, of the valve shown in FIG. 1, again showing the valve in its closed position.

The valve operates as follows. Referring specifically to FIG. 4, this shows the valve in its open position with the aperture 13 in complete register with the passageways 3 and 4. The seals 7 and 8, which are slightly compressed by the vane 9, ensure that the path between the passageways 3 and 4 is fluid-tight. The valve may be closed by depressing the enlarged end 12, as shown by the arrow A in FIG. 4, whereupon the vane 9 pivots about the mount 10 in a downward direction. In the closed position, the V-shaped channel 15 interconnects the outlet passageway 4 with the exhaust passageway 16 formed in the body part 1b and hence with the atmosphere, whereas the inlet passageway 3 is closed off by the vane 9—see FIGS. 2 and 3. Accordingly, compressed air in the outlet (downstream) side of the installation will exhaust to atmosphere.

Whilst the exhaust channel 15 could, in principle, be straight, we have found it preferable to make it V-shaped so that, during movement of the vane 9, the seal 8' is always adequately supported and will not be dislodged by the differential air pressure across it which could otherwise interfere with smooth movement of the vane 9. The member 14 extending diametrically of the aperture 13 serves a similar purpose. Further, the V-shaped channel 15 is disposed on the surface of the vane 9 relative to the aperture 13 such that the inlet passageway 3 will be substantially completely closed off before the channel 15 interconnects the outlet passageway 4 with the exhaust passageway 16.

As will be appreciated, the valve specifically described above could be arranged to exhaust the inlet (upstream) side of a compressed air or other fluid supply installation, if desired. Further, the V-shaped channel 15 could, in an alternative construction (not shown), communicate with a small through-bore formed in the vane 9 through which the exhaust air passes to atmosphere via the further exhaust passageway formed in the valve body.

Finally, and as is conventional, the vane 9 may be formed with a pair of peripheral apertures (not shown) that enables the valve to be locked in its open or closed position, as the case may be, by means of a padlock or other locking device.

What is claimed is:

1. A fluid flow control valve comprising:

first and second body parts secured together and defining, respectively, first and second substantially central fluid flow passageways, said body parts further defining a cavity into which said first and second fluid flow passageways open in register with one another, a vane mounted in said cavity and having opposed ends that project from the cavity beyond confines of said body parts, said vane having an orifice therethrough and being slidable, by the application of manual force to at least one of said ends, within said cavity and thus laterally with respect to said fluid flow passageways between (1) a valve-open position in which said orifice in the vane is in register with said fluid flow passageways thereby permitting fluid to flow between said passageways and (2) a valve-closed position in which said orifice is wholly out of register with said fluid flow passageways thereby preventing the flow of fluid between said fluid flow passageways, said first body part having a fluid exhaust passageway formed therein having first and second ends, said first end of said fluid exhaust passageway opening into said cavity adjacent to said first fluid flow passageway and said second end of said fluid exhaust passageway opening to atmosphere, substantially annular elastomer sealing elements between said first body part and the vane and having a common section located between the first fluid flow passageway and the fluid exhaust passageway, and a third, substantially annular elastomeric sealing element between said second body part and the vane at a location where said second fluid flow passageway opens into said cavity, said vane having formed in the surface thereof facing said first body part an exhaust channel which, in the valve-open position, is inoperative but which, in the valve-closed position, bridges said common section of said first and second sealing means and connects said first fluid flow passageway to said fluid exhaust passageway whereby fluid can exhaust to atmosphere from said first fluid flow passageway via said exhaust channel and said fluid exhaust passageway.

2. A valve according to claim 1 wherein the vane is pivotally mounted within said cavity so as to move between said valve-open and valve-closed positions in an arcuate path.

3. A valve according to claim 2 wherein said exhaust channel is substantially V-shaped.

4. A valve according to claim 1 wherein said second end of said fluid exhaust passageway terminates in a threaded port whereby a silencer or pipe connector may be threadedly coupled thereto.

5. A fluid flow control valve comprising:

first and second body parts secured together and defining, respectively, first and second substantially central fluid flow passageways, said body parts further defining a cavity into which said first and second fluid flow passageways open in register with one another, a vane mounted in said cavity and having opposed ends that project from the cavity beyond confines of said body parts, said vane having an orifice therethrough and being slidable, by the application of manual force to at least one of said ends, within said cavity and thus laterally with respect to said fluid flow passageways between (1) a valve-open position in which said orifice in the vane is in register with said fluid flow passageways thereby permitting fluid to flow between said passageways and (2) a valve-closed position in which said orifice is wholly out of register with said fluid flow passageways thereby preventing the flow of fluid between said fluid flow passageways, said first body part having a fluid exhaust passageway formed therein having first and second ends, said first end of said fluid exhaust passageway opening into said cavity adjacent to said first fluid flow passageway and said second end of said fluid exhaust passageway opening to atmosphere, substantially annular elastomer sealing elements between said first body part and the vane and having a common section located between the first fluid flow passageway and the fluid exhaust passageway, and a third, substantially annular elastomeric sealing element between said second body part and the vane at a location where said second fluid flow passageway opens into said cavity, said vane having formed in the surface thereof facing said second body part an exhaust channel which communicates with a through-bore in the vane, said exhaust channel in the valve-open position, being inoperative but in the valve-closed position, bridges a section of said third, substantially annular sealing element and communicates with said second fluid flow passageway with said through-bore communicating with said fluid exhaust passageway, whereby fluid can exhaust to atmosphere from said second fluid flow passageway via said exhaust channel, said through-bore and said fluid exhaust passageway.

\* \* \* \* \*